(12) United States Patent
Rodriguez Bravo et al.

(10) Patent No.: US 12,393,675 B2
(45) Date of Patent: Aug. 19, 2025

(54) MULTIFACTOR AUTHORIZATION ON ACCESSING HARDWARE RESOURCES

(71) Applicant: Kyndryl, Inc., New York, NY (US)

(72) Inventors: Cesar Augusto Rodriguez Bravo, Alajuela (CR); David Alonso Campos Batista, Aurora (CR)

(73) Assignee: Kyndryl, Inc., New York, NY (US)

(*) Notice: Subject to any disclaimer, the term of this patent is extended or adjusted under 35 U.S.C. 154(b) by 0 days.

(21) Appl. No.: 18/422,108

(22) Filed: Jan. 25, 2024

(65) Prior Publication Data
US 2024/0160721 A1 May 16, 2024

Related U.S. Application Data

(63) Continuation of application No. 17/347,018, filed on Jun. 14, 2021, now Pat. No. 11,921,842.

(51) Int. Cl.
*G06F 21/52* (2013.01)
*G06F 21/40* (2013.01)

(52) U.S. Cl.
CPC .............. *G06F 21/52* (2013.01); *G06F 21/40* (2013.01); *G06F 2221/2113* (2013.01)

(58) Field of Classification Search
CPC ... G06F 21/40; G06F 21/52; G06F 2221/2113
See application file for complete search history.

(56) References Cited

U.S. PATENT DOCUMENTS

| 6,687,823 B1 | 2/2004 | Al-Salqan | |
| 7,908,645 B2 * | 3/2011 | Varghese | G06F 21/552 |
| | | | 715/833 |

(Continued)

FOREIGN PATENT DOCUMENTS

| CN | 105069876 B | | 6/2018 | |
| WO | 2015112760 | | 7/2015 | |
| WO | WO 2015/066389 | * | 7/2015 | ............. G06F 21/00 |

OTHER PUBLICATIONS

"How it works: Azure AD Multi-Factor Authentication", Microsoft Build, Jul. 14, 2020, 4 pages, <https://docs.microsoft.com/en-us/azure/active-directory/authentication/concept-mfa-howitworks>.

(Continued)

*Primary Examiner* — Sharon S Lynch
(74) *Attorney, Agent, or Firm* — Erik Swanson; Andrew M. Calderon; Calderon Safran & Wright P.C.

(57) ABSTRACT

In an approach for multifactor authorization on hardware calls of resources, a processor receives a request for a hardware resource from a plurality of hardware resources being monitored. A processor calculates a risk level associated with the hardware resource of the request based on a respective risk level data repository. A processor, in response to a determination the risk level requires multifactor authorization, determines that a user associated with the request is logged in. A processor identifies a mechanism used by the user to log in. A processor determines whether a challenge associated with the multifactor authorization based on the mechanism is successful. A processor, in response to a determination the challenge associated with the multifactor authorization is successful, enables access to the hardware resource of the request.

20 Claims, 4 Drawing Sheets

| | 302 Device Status | 304 Camera | 306 Microphone |
|---|---|---|---|
| 308 310 | Idle | High | High |
| 312 | Active | Minimal | Minimal |
| | Logged Off | Critical | High |

(56) References Cited

U.S. PATENT DOCUMENTS

| | | | | |
|---|---|---|---|---|
| 8,090,961 | B2* | 1/2012 | Yoffe | G06F 21/82 |
| | | | | 713/153 |
| 8,572,391 | B2* | 10/2013 | Golan | G06F 21/577 |
| | | | | 705/72 |
| 8,584,219 | B1* | 11/2013 | Toole | H04L 69/24 |
| | | | | 726/25 |
| 8,732,827 | B1* | 5/2014 | Zhukov | H04L 51/212 |
| | | | | 726/22 |
| 8,789,194 | B2* | 7/2014 | Toole | G06F 21/316 |
| | | | | 726/25 |
| 8,806,632 | B2* | 8/2014 | Stefanidakis | H04L 63/1433 |
| | | | | 726/25 |
| 8,955,045 | B2* | 2/2015 | Smith | H04L 63/08 |
| | | | | 726/1 |
| 8,988,532 | B2* | 3/2015 | Soffer | G03B 17/18 |
| | | | | 348/207.1 |
| 9,179,058 | B1* | 11/2015 | Zeira | H04N 23/661 |
| 9,179,105 | B1* | 11/2015 | Zeira | H04N 7/183 |
| 9,179,316 | B2 | 11/2015 | Raleigh | |
| 9,208,349 | B1* | 12/2015 | Miliefsky | G06F 21/577 |
| 9,330,257 | B2* | 5/2016 | Valencia | G06F 21/316 |
| 9,331,992 | B2 | 5/2016 | Hannel | |
| 9,369,560 | B2* | 6/2016 | Kim | H04M 1/68 |
| 9,547,607 | B2* | 1/2017 | Miller | G06F 13/122 |
| 9,607,507 | B1* | 3/2017 | McClintock | G08C 17/04 |
| 9,684,775 | B2* | 6/2017 | Gupta | H04L 63/1433 |
| 9,742,559 | B2* | 8/2017 | Christodorescu | G06F 21/57 |
| 9,749,333 | B2 | 8/2017 | Lloyd | |
| 9,774,586 | B1 | 9/2017 | Roche | |
| 9,788,209 | B2 | 10/2017 | Hauck | |
| 9,866,572 | B2* | 1/2018 | Blue | H04L 63/1408 |
| 9,911,006 | B2* | 3/2018 | Miliefsky | G06F 21/602 |
| 9,942,269 | B2* | 4/2018 | Miliefsky | H04L 63/1416 |
| 10,225,267 | B2* | 3/2019 | Blue | H04L 63/1408 |
| 10,270,804 | B2* | 4/2019 | Niemela | H04L 63/145 |
| 10,306,125 | B2* | 5/2019 | Zeira | H04N 23/51 |
| 10,306,129 | B1* | 5/2019 | Bentley | G06F 3/165 |
| 10,395,066 | B1* | 8/2019 | Radulov | G06F 21/629 |
| 10,395,452 | B2 | 8/2019 | Morrison | |
| 10,673,861 | B2 | 6/2020 | Karunakaran | |
| 10,713,354 | B2* | 7/2020 | Chen | G06F 21/44 |
| 10,778,698 | B2* | 9/2020 | Blue | H04L 63/1408 |
| 10,855,725 | B2* | 12/2020 | Pai | G06F 21/53 |
| 11,210,398 | B2* | 12/2021 | Bikumala | G06F 21/566 |
| 11,288,363 | B2* | 3/2022 | Bikumala | H04R 3/00 |
| 11,606,460 | B2* | 3/2023 | Soffer | H04M 3/205 |
| 2002/0169986 | A1 | 11/2002 | Lortz | |
| 2004/0073666 | A1 | 4/2004 | Foster | |
| 2005/0097320 | A1* | 5/2005 | Golan | G06Q 20/4014 |
| | | | | 713/166 |
| 2005/0177724 | A1* | 8/2005 | Ali | G06F 21/31 |
| | | | | 713/168 |
| 2006/0282660 | A1* | 12/2006 | Varghese | G07F 7/1083 |
| | | | | 713/155 |
| 2008/0178282 | A1* | 7/2008 | Yoffe | G06F 21/70 |
| | | | | 726/17 |
| 2010/0099396 | A1* | 4/2010 | Huq | H04L 67/04 |
| | | | | 455/420 |
| 2010/0169975 | A1* | 7/2010 | Stefanidakis | H04L 63/1433 |
| | | | | 726/25 |
| 2012/0122524 | A1* | 5/2012 | Kim | H04M 1/68 |
| | | | | 455/566 |
| 2012/0151606 | A1* | 6/2012 | Hannon | G06F 21/83 |
| | | | | 726/29 |
| 2013/0055347 | A1* | 2/2013 | Chawla | G06F 21/53 |
| | | | | 726/16 |
| 2013/0060905 | A1 | 3/2013 | Mickens | |
| 2013/0205382 | A1* | 8/2013 | Barbour | G06F 21/40 |
| | | | | 726/7 |
| 2013/0222609 | A1* | 8/2013 | Soffer | G06F 21/81 |
| | | | | 348/207.1 |
| 2014/0096177 | A1* | 4/2014 | Smith | H04L 63/08 |
| | | | | 726/1 |
| 2014/0130127 | A1* | 5/2014 | Toole | G06F 21/316 |
| | | | | 726/3 |
| 2014/0150100 | A1* | 5/2014 | Gupta | H04L 63/1425 |
| | | | | 726/22 |
| 2014/0205099 | A1* | 7/2014 | Christodorescu | H04L 9/321 |
| | | | | 380/278 |
| 2014/0317734 | A1* | 10/2014 | Valencia | G06F 21/552 |
| | | | | 726/22 |
| 2015/0106888 | A1 | 4/2015 | Cheng | |
| 2016/0094664 | A1 | 3/2016 | Olcese | |
| 2016/0110528 | A1* | 4/2016 | Gupta | H04L 63/08 |
| | | | | 726/19 |
| 2016/0171195 | A1 | 6/2016 | Moloian | |
| 2016/0203326 | A1* | 7/2016 | Miliefsky | G06F 21/629 |
| | | | | 726/29 |
| 2016/0241999 | A1 | 8/2016 | Chin | |
| 2017/0353496 | A1* | 12/2017 | Pai | H04L 63/10 |
| 2018/0107831 | A1* | 4/2018 | Miliefsky | G06F 21/629 |
| 2019/0034624 | A1* | 1/2019 | Chen | G06F 21/60 |
| 2020/0044851 | A1* | 2/2020 | Everson | G06Q 20/3821 |
| 2020/0104476 | A1* | 4/2020 | Radulov | G06F 21/83 |
| 2022/0385656 | A1* | 12/2022 | Gujarathi | H04L 63/0876 |

OTHER PUBLICATIONS

"Multi-factor Authentication in Auth0", Auth O Docs, Printed May 5, 2021, 5 pages, <https://auth0.com/docs/mfa>.

Cook, David, "Hackers can access your mobile and laptop cameras and record you—cover them up now", The Conversation, Apr. 16, 2020, 4 pages, <https://theconversation.com/hackers-can-access-your-mobile-and-laptop-cameras-and-record-you-cover-them-up-now-135933>.

Search Query Report from IP.com (performed Jan. 27, 2023) (Year: 2023).

List of Kyndryl Patents or Patent Applications Treated as Related, dated Jan. 25, 2024, 2 pages.

\* cited by examiner

| 302 Device Status | 304 Camera | 306 Microphone |
|---|---|---|
| 308 Idle | High | High |
| 310 Active | Minimal | Minimal |
| 312 Logged Off | Critical | High |

FIG. 3A

| 314 Application Type | 304 Camera |
|---|---|
| App 1 | High |
| App 2 | Minimal |
| App 3 | Critical |

FIG. 3B

| 316 User Location | 320 Webcam | 306 Microphone |
|---|---|---|
| 318 Home | Low | High |
| 322 Office | High | Low |

FIG. 3C

MULTIFACTOR AUTHORIZATION ON ACCESSING HARDWARE RESOURCES

BACKGROUND

The present disclosure relates generally to the field of security authorization, and more particularly to multifactor authorization on hardware calls of resources.

Authentication confirms that users are who the users say the users are. Authorization gives those users permission to access a resource. Authentication may be an act of validating that users are whom the users claim to be. In some instances, systems may require the successful verification of more than one factor before granting access. A multifactor authentication requirement may often be deployed to increase security beyond what passwords alone can provide. Authorization in a security system may include the process of giving a user permission to access a specific resource or function. In secure environments, authorization may follow authentication. Users may first prove that the users' identities are genuine before an organization's administrators grant the users access to the requested resources. Despite the similar-sounding terms, authentication and authorization are separate steps in the login process.

SUMMARY

Aspects of an embodiment of the present disclosure disclose an approach for multifactor authorization on hardware calls of resources. A processor receives a request for a hardware resource from a plurality of hardware resources being monitored. A processor calculates a risk level associated with the hardware resource of the request based on a respective risk level data repository. A processor, in response to a determination the risk level requires multifactor authorization, determines that a user associated with the request is logged in. A processor identifies a mechanism used by the user to log in. A processor determines whether a challenge associated with the multifactor authorization based on the mechanism is successful. A processor, in response to a determination the challenge associated with the multifactor authorization is successful, enables access to the hardware resource of the request.

BRIEF DESCRIPTION OF THE DRAWINGS

FIGS. 3A-3C illustrate exemplary risk level determination of the authorization module within the computing device of FIG. 1, in accordance with an embodiment of the present disclosure.

DETAILED DESCRIPTION

The present disclosure is directed to systems and methods for multifactor authorization on hardware calls of resources.

Embodiments of the present disclosure disclose a control system and method with an authorization mechanism to access a given hardware resource by an already authenticated user. Embodiments of the present disclosure disclose monitoring the request of access to hardware during runtime or execution when the user is already logged in. Embodiments of the present disclosure disclose a system that performs an additional authentication when a specific hardware resource is called (even if the user is already authorized to use that system). Embodiments of the present disclosure disclose using a risk level to trigger an authorization scheme.

Embodiments of the present disclosure disclose monitoring hardware calls from applications. When a request is received, the system may check a risk level of accessing the hardware. The risk level may be a level that is used to define the actions that will be executed if a risk level condition is met. If the risk level is flagged as high or critical, the system may execute a request for multifactor authorization. Embodiments of the present disclosure disclose checking what type of permissions the user has. If the user is not logged in, the system may execute a separate set of security actions. Embodiments of the present disclosure disclose requesting a secondary factor to authorize the request to enable the hardware device. Embodiments of the present disclosure disclose preventing an attacker, that may have compromised a user's password, from turning on or accessing a hardware resource in the system.

Embodiments of the present disclosure disclose a multifactor authorization on hardware calls of resources. Embodiments of the present disclosure disclose receiving a request for a hardware resource from a plurality of hardware resources being monitored and determining a risk level associated with the hardware resource of the request using a respective risk level repository. Embodiments of the present disclosure disclose determining whether a user associated with the request is logged in. Embodiments of the present disclosure disclose identifying a mechanism used by the user to log in. Embodiments of the present disclosure disclose executing a set of predetermined security actions. Embodiments of the present disclosure disclose enabling access to the hardware resource of the request.

Figure 1:
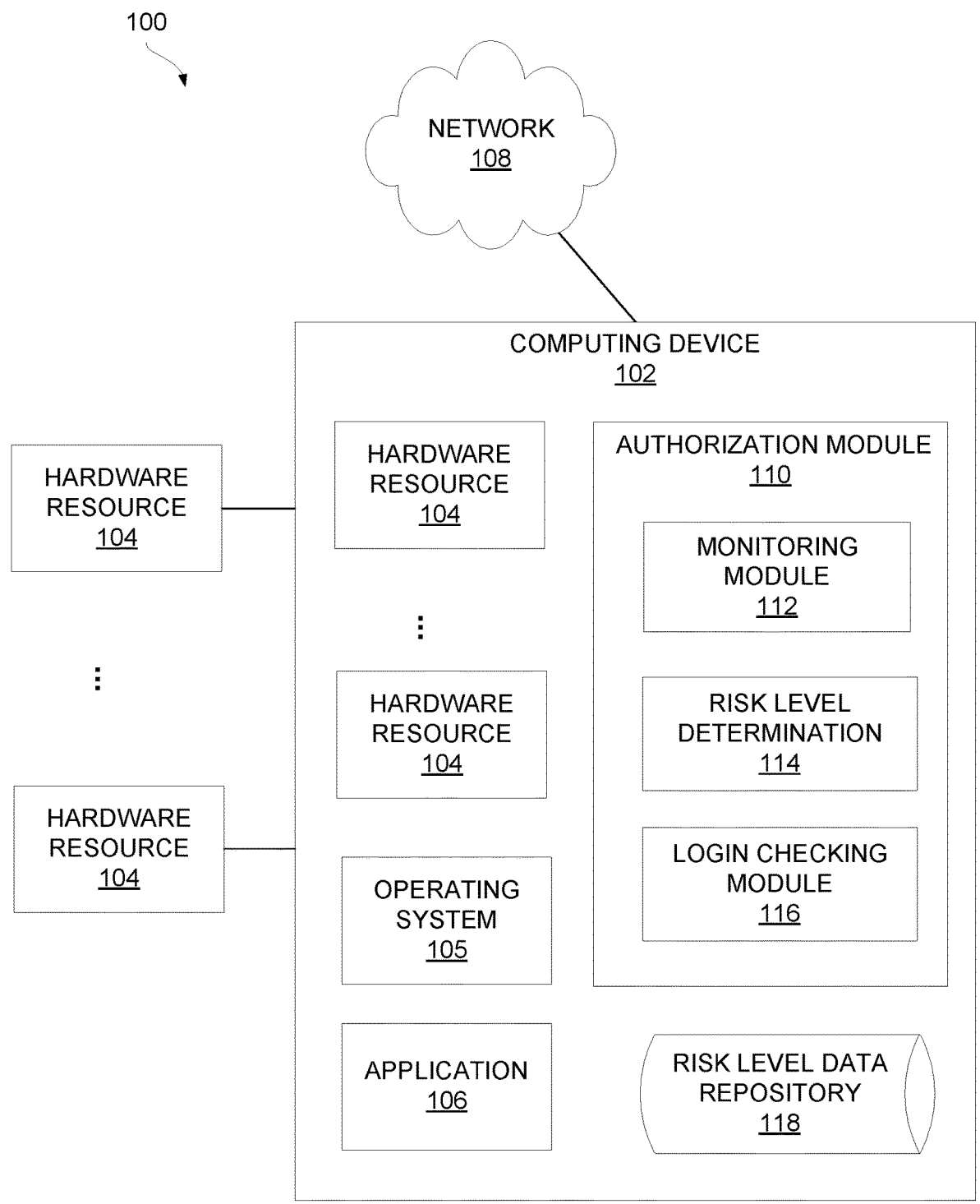
FIG. 1 is a functional block diagram illustrating a multifactor authorization environment, in accordance with an embodiment of the present disclosure.

The present disclosure will now be described in detail with reference to the Figures. FIG. 1 is a functional block diagram illustrating a multifactor authorization environment, generally designated 100, in accordance with an embodiment of the present disclosure.

In the depicted embodiment, multifactor authorization environment 100 includes computing device 102, one or more hardware resources 104, and network 108. Hardware resources 104 may be devices that computing device 106 can access. In the depicted embodiment, some hardware resources 104 are located on computing device 102. Some hardware resources 104 may be located externally and accessed directly by computing device 102 or through a communication network such as network 108.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to authorization module 110 and network 108 and is capable of processing program instructions and executing authorization module 110, in accordance with an embodiment of the present disclosure. Computing device 102 may include internal and external hardware components, as depicted and described in further detail with respect to FIG. 4.

Further, in the depicted embodiment, computing device 102 includes authorization module 110, operating system 105, application 106, and risk level data repository 118. Computing device 102 may also include one or more hardware resources 104. In the depicted embodiment, authorization module 110 is located on computing device 102. However, in other embodiments, authorization module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and authorization module 110, in accordance with a desired embodiment of the disclosure.

In one or more embodiments, authorization module 110 is configured to monitor hardware calls from application 106 for a plurality of hardware resources 104. Authorization module 110 may monitor the request of access to hardware resource 104 during runtime or execution when a user is already logged in. Authorization module 110 may receive a request from application 106 for accessing a hardware resource from the plurality of hardware resources 104.

In one or more embodiments, authorization module 110 is configured to calculate a risk level associated with the hardware resource of the request based on risk level data repository 118. Authorization module 110 may determine a risk level associated with the hardware resource of the request based on risk level data repository 118. A risk level is a level that is used to define an action that will be executed if a risk condition is met. For example, authorization module 110 may define the risk level as "minimal", "low", "medium", "high", and "critical" for each hardware resource 104 respectively. In an example, if the risk level is flagged as "high" or "critical", authorization module 110 may execute a request for the multifactor authorization. Authorization module 110 may determine the risk level based on a status of hardware resource 104. Authorization module 110 may adjust the risk level based on the status of hardware resource 104. For example, if the status of hardware resource 104 is idle, authorization module 110 may adjust the risk level to "high". If the status of hardware resource 104 is active, authorization module 110 may adjust the risk level to "minimal". If the status of hardware resource 104 is logged off, authorization module 110 may adjust the risk level to "critical". In another example, authorization module 110 may determine the risk level based on a type of application 106. For example, authorization module 110 may adjust the risk level based on what kind of application 106 making the request to access hardware resource 104. Authorization module 110 may determine the risk level based on a plurality of metadata about application 106. For example, the metadata about application 106 can be rating, category, usage, access, and permission of application. The metadata can be any other suitable metadata of application 106 for determining the risk level. In another example, authorization module 110 may automatically adjust the risk level based on a user location. In some other examples, authorization module 110 may adjust the risk level based on user activity, logged user information, time and date. Authorization module 110 may adjust the risk level based on any other suitable factors associated with the access request of hardware resources 104.

In one or more embodiments, authorization module 110 is configured to determine whether the risk level of requesting access to hardware resource 104 requires multifactor authorization based on risk level data repository 118. Authorization module 110 may use the risk level to trigger an authorization scheme. If authorization module 110 determines that the risk level of requesting access to hardware resource 104 does not require multifactor authorization based on risk level data repository 118, authorization module 110 may keep on monitoring hardware calls from application 106 for hardware resources 104. If authorization module 110 determines the risk level requires multifactor authorization, authorization module 110 may determine whether a user associated with the request to hardware resource 104 is logged in. If authorization module 110 determines the user is not logged in, authorization module 110 may execute a set of predetermined security actions, e.g., locking hardware resource 104, sending an alert to the user. If authorization module 110 determines that the user associated with the request to hardware resource 104 is logged in, authorization module 110 may determine who the user is and what type of permission the user has. Authorization module 110 may identify a mechanism used by the user to log in. Authorization module 110 may present a multifactor authentication based on the mechanism used by the user to log in. Authorization module 110 may determine the type of the multifactor authorization to be presented based on the mechanisms used by the user to log in. For example, authorization module 110 may identify whether the mechanism used by the user is a single factor, a single step, multiple steps, or any other mechanism. Authorization module 110 may request a secondary factor to authorize the request to enable hardware resource 104. For example, if the user is logged in with a pin or password, authorization module 110 may send validation to a secondary device (e.g., using an application programming interface call). If the user is logged in with a fingerprint, authorization module 110 may ask for a pin or password as a secondary factor for authorization.

In one or more embodiments, authorization module 110 is configured to determine whether a challenge associated with the multifactor authorization is successful. For example, authorization module 110 may present a multifactor authentication challenge based on the mechanism used by the user to log in. Authorization module 110 may request a secondary factor to authorize the request to enable hardware resource 104. For example, if the user is logged in with a pin or password, authorization module 110 may send validation to a secondary device (e.g., using an application programming interface call). If the user is logged in with a fingerprint, authorization module 110 may ask for a pin or password as a secondary factor for authorization. If authorization module 110 determines that the challenge associated with the multifactor authorization is not successful, authorization module 110 may execute a set of predetermined security actions. If authorization module 110 determines that the challenge associated with the multifactor authorization is successful, authorization module 110 enables access to hardware resource 104 of the request. Authorization module 110 may enable access to hardware resource 104 of the request through operating system 105. For example, authorization module 110 may accordingly prevent an attacker that has compromised the user's password to access hardware resources 104 (e.g., preventing the attacker from turning on the user's camera without the user's authorization). Authorization module 110 may accordingly prevent an attacker that compromised a log-in vulnerability to enable hardware resources 104 (e.g., preventing the attacker from enabling the user's Bluetooth to exfiltrate files without the user's authorization).

In the depicted embodiment, authorization module 110 includes monitoring module 110, risk level determination 114, and login checking module 116. In one or more embodiments, monitoring module 110 is configured to monitor hardware calls from application 106 for a plurality of hardware resource(s) 104. Monitoring module 110 may monitor the request of access to hardware resource 104 during runtime or execution when a user is already logged in. Monitoring module 110 may receive a request from application 106 for accessing a hardware resource from the plurality of hardware resources 104.

In one or more embodiments, risk level determination 114 is configured to determine a risk level associated with the hardware resource of the request based on risk level data repository 118. A risk level may be a level that is used to define an action that will be executed if a risk level condition is met. For example, risk level determination 114 may define the risk level as "minimal", "low", "medium", "high", and "critical" for each hardware resource 104 respectively. In an example, if the risk level is flagged as "high" or "critical", authorization module 110 may execute a request for the multifactor authorization. Risk level determination 114 may determine the risk level based on a status of hardware resource 104. Risk level determination 114 may adjust the risk level based on the status of hardware resource 104. For example, if the status of hardware resource 104 is idle, risk level determination 114 may adjust the risk level to "high". If the status of hardware resource 104 is active, risk level determination 114 may adjust the risk level to "minimal". If the status of hardware resource 104 is logged off, risk level determination 114 may adjust the risk level to "critical". In another example, risk level determination 114 may determine the risk level based on a type of application 106. For example, risk level determination 114 may adjust the risk level based on what kind of application 106 making the request to access hardware resource 104. Risk level determination 114 may determine the risk level based on a plurality of metadata about application 106. For example, the metadata about application 106 can be rating, category, usage, access, and permission of application. The metadata can be any other suitable metadata of application 106 for determining the risk level. In another example, risk level determination 114 may automatically adjust the risk level based on a user location. In some other examples, risk level determination 114 may adjust the risk level based on user activity, logged user information, time, and date. Risk level determination 114 may adjust the risk level based on any other suitable factors associated with the access request of hardware resource 104.

In one or more embodiments, risk level determination 114 is configured to determine whether the risk level of requesting access to hardware resource 104 requires multifactor authorization based on risk level data repository 118. Risk level determination 114 may use the risk level to trigger an authorization scheme. If risk level determination 114 determines that the risk level of requesting access to hardware resource 104 does not require multifactor authorization based on risk level data repository 118, risk level determination 114 may keep on monitoring hardware calls from application 106 for hardware resources 104. If risk level determination 114 determines the risk level requires multifactor authorization, authorization module 110 may determine whether a user associated with the request to hardware resource 104 is logged in. If authorization module 110 determines the user is not logged in, authorization module 110 may execute a set of predetermined security actions, e.g., locking hardware resource 104, sending an alert to the user. If authorization module 110 determines that the user associated with the request to hardware resource 104 is logged in, login checking module 116 may determine who the user is and what type of permission the user has. Login checking module 116 may identify a mechanism used by the user to log in. For example, login checking module 116 may identify whether the mechanism used by the user is a single factor, a single step, multiple steps, or any other mechanism. Login checking module 116 may request a secondary factor to authorize the request to enable hardware resource 104. For example, if the user is logged in with a pin or password, login checking module 116 may send validation to a secondary device (e.g., using an application programming interface call). If the user is logged in with a fingerprint, login checking module 116 may ask for a pin or password as a secondary factor for authorization.

In one or more embodiments, login checking module 116 is configured to determine whether a challenge associated with the multifactor authorization is successful. If login checking module 116 determines that the challenge associated with the multifactor authorization is not successful, login checking module 116 may execute a set of predetermined security actions. If login checking module 116 determines that the challenge associated with the multifactor authorization is successful, login checking module 116 may enable access to hardware resource 104 of the request. Authorization module 110 may enable access to hardware resource 104 of the request through operating system 105.

Figure 2:
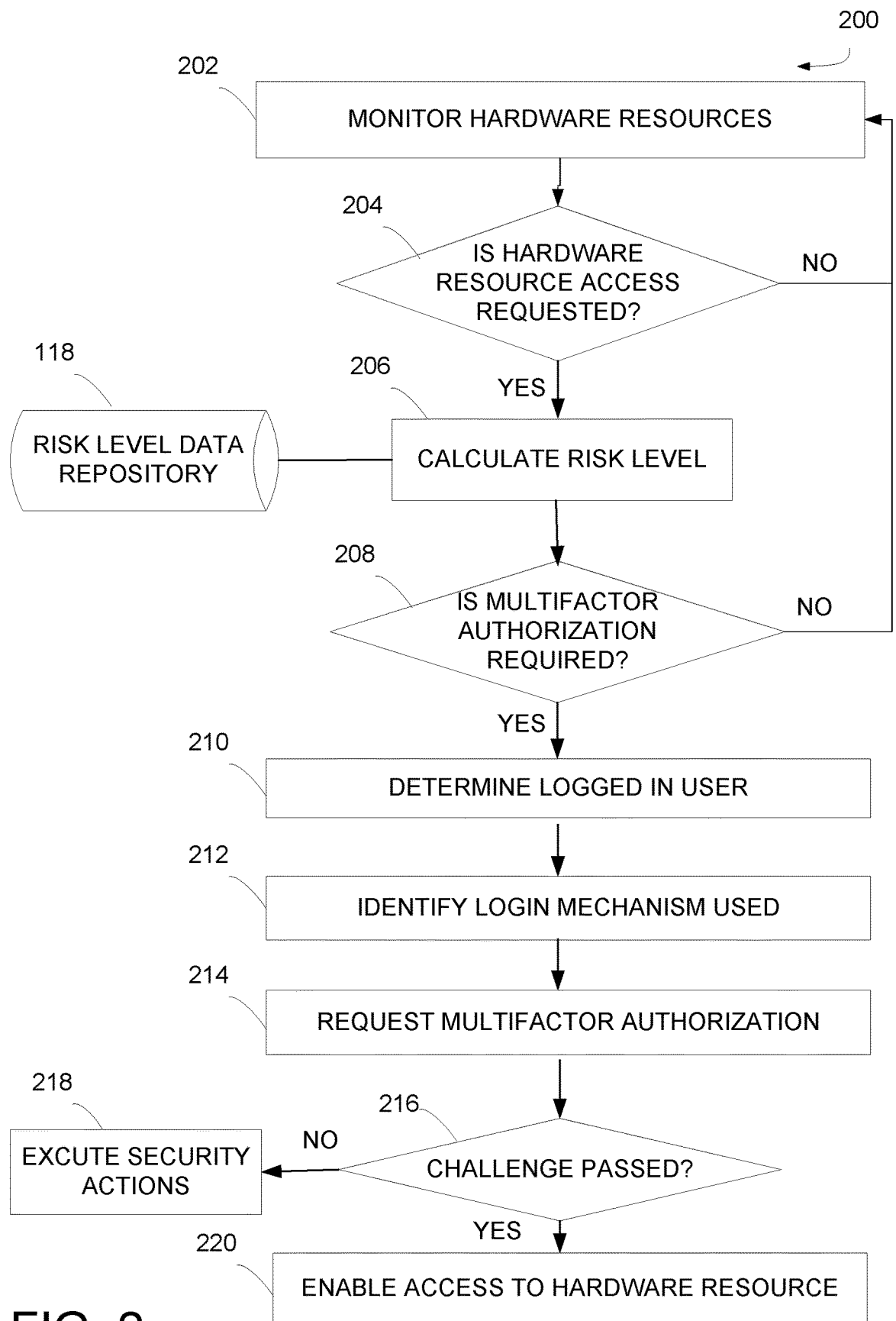
FIG. 2 is a flowchart depicting operational steps of an authorization module within a computing device of FIG. 1, in accordance with an embodiment of the present disclosure.

FIG. 2 is a flowchart 200 depicting operational steps of authorization module 110 in accordance with an embodiment of the present disclosure.

Authorization module 110 operates to monitor hardware calls from application 106 for a plurality of hardware resources 104. Authorization module 110 may monitor the request of access to hardware resources 104 during runtime or execution when a user is already logged in. Authorization module 110 operates to determine whether a hardware resource access is requested. Authorization module 110 operates to determine a risk level associated with the hardware resource of the request based on risk level data repository 118. Authorization module 110 operates to determine whether the risk level of requesting access to hardware resource 104 requires multifactor authorization based on risk level data repository 118. Authorization module 110 operates to determine whether a user associated with the request to hardware resource 104 is logged in. Authorization module 110 operates to identify a mechanism used by the user to log in. Authorization module 110 operates to request multifactor authorization. Authorization module 110 operates to determine whether a challenge associated with the multifactor authorization is successful. Authorization module 110 operates to execute a set of predetermined security actions. Authorization module 110 operates to enable access to hardware resource 104 of the request.

In step 202, authorization module 110 monitors hardware calls from application 106 for a plurality of hardware resources 104. Authorization module 110 may monitor the request of access to hardware resources 104 during runtime or execution when a user is already logged in. Authorization module 110 may receive a request from application 106 for accessing a hardware resource from the plurality of hardware resources 104. In decision 204, authorization module 110 determines whether a hardware resource access is requested. If authorization module 110 determines that there is not a hardware resource access requested (decision 204, "NO" branch), authorization module 110 continues to monitor the request of access to hardware resources 104 during runtime in step 202. If authorization module 110 determines that there is a hardware resource access requested (decision 204, "YES" branch), in step 206, authorization module 110 determines a risk level associated with the hardware resource of the request based on risk level data repository 118. Authorization module 110 may calculate the risk level associated with the hardware resource of the request based on risk level data repository 118. A risk level is a level that is used to define an action that will be executed if a risk condition is met. For example, authorization module 110 may define the risk level as "minimal", "low", "medium", "high", and "critical" for each hardware resource 104 respectively. Authorization module 110 may store the risk level data associated to each hardware resource 104 in risk level data repository 118. In an example, if the risk level is flagged as "high" or "critical", authorization module 110 may execute a request for the multifactor authorization. Authorization module 110 may determine the risk level based on a status of hardware resource 104. Authorization module 110 may adjust the risk level based on the status of hardware resource 104. For example, if the status of hardware resource 104 is idle, authorization module 110 may adjust the risk level to "high". If the status of hardware resource 104 is active, authorization module 110 may adjust the risk level to "minimal". If the status of hardware resource 104 is logged off, authorization module 110 may adjust the risk level to "critical". In another example, authorization module 110 may determine the risk level based on a type of application 106. For example, authorization module 110 may adjust the risk level based on what kind of application 106 making the request to access hardware resource 104. Authorization module 110 may determine the risk level based on a plurality of metadata about application 106. For example, the metadata about application 106 can be rating, category, usage, access, and permission of application. The metadata can be any other suitable metadata of application 106 for determining the risk level. In another example, authorization module 110 may automatically adjust the risk level based on a user location. In some other examples, authorization module 110 may adjust the risk level based on user activity, logged user information, time and date. Authorization module 110 may adjust the risk level based on any other suitable factors associated with the access request of hardware resource 104.

In decision 208, authorization module 110 determines whether the risk level of requesting access to hardware resource 104 requires multifactor authorization based on risk level data repository 118. Authorization module 110 may use the risk level to trigger an authorization scheme. If authorization module 110 determines that the risk level of requesting access to hardware resource 104 does not require multifactor authorization (decision 208, "NO" branch), authorization module 110 may keep on monitoring hardware calls from application 106 for hardware resources 104. If authorization module 110 determines the risk level requires multifactor authorization (decision 208, "YES" branch), in step 210, authorization module 110 determines whether a user associated with the request to hardware resource 104 is logged in. If authorization module 110 determines the user is not logged in, authorization module 110 may execute a set of predetermined security actions, e.g., locking hardware resource 104, sending an alert to the user. If authorization module 110 determines that the user associated with the request to hardware resource 104 is logged in, authorization module 110 may determine who the user is and what type of permission the user has.

In step 212, authorization module 110 identifies a mechanism used by the user to log in. For example, authorization module 110 may identify whether the mechanism used by the user is a single factor, a single step, multiple steps, or any other mechanism. In step 214, authorization module 110 requests multifactor authorization. Authorization module 110 may present a multifactor authentication based on the mechanism used by the user to log in. Authorization module 110 may determine the type of the multifactor authorization to be presented based on the mechanisms used by the user to log in. For example, authorization module 110 may request a secondary factor to authorize the request to enable hardware resource 104. For example, if the user is logged in with a pin or password, authorization module 110 may send validation to a secondary device (e.g., using an application programming interface call). If the user is logged in with a fingerprint, authorization module 110 may ask for a pin or password as a secondary factor for authorization.

In decision 216, authorization module 110 is configured to determine whether a challenge associated with the multifactor authorization is successful. For example, authorization module 110 may present a multifactor authentication challenge based on the mechanism used by the user to log in. Authorization module 110 may request a secondary factor to authorize the request to enable hardware resource 104. For example, if the user is logged in with a pin or password, authorization module 110 may send validation to a secondary device (e.g., using an application programming interface call). If the user is logged in with a fingerprint, authorization module 110 may ask for a pin or password as a secondary factor for authorization. If authorization module 110 determines that the challenge associated with the multifactor authorization is not successful (decision 216, "NO" branch), authorization module 110 may execute a set of predetermined security actions in step 218. If authorization module 110 determines that the challenge associated with the multifactor authorization is successful (decision 216, "YES" branch), authorization module 110 enables access to hardware resource 104 of the request in step 220. Authorization module 110 may enable access to hardware resource 104 of the request through operating system 105. For example, authorization module 110 may accordingly prevent an attacker that has compromised the user's password to access hardware resources 104 (e.g., to prevent the attacker from turning on the user's camera without the user's authorization). Authorization module 110 may accordingly prevent an attacker that has compromised a log-in vulnerability to enable hardware resources 104 (e.g., to prevent the attacker from enabling the user's Bluetooth to exfiltrate files without the user's authorization).

FIGS. 3A-3C illustrate exemplary risk level determination of authorization module 110, in accordance with an embodiment of the present disclosure.

In the example of FIG. 3A, authorization module 110 may determine a risk level based on device status 302 of hardware resources 104 (e.g., camera 304, microphone 306). In the example, device status 302 is idle 308, active 310, and logged off 312. For the example of camera 304, the risk level is set as high, minimal, and critical when device status 302 is idle 308, active 310, and logged off 312, respectively. For the example of microphone 306, the risk level is set as high, minimal, and high when device status 302 is idle 308, active 310, and logged off 312, respectively.

In the example of FIG. 3B, authorization module 110 may determine the risk level based on application type 314. For example, risk level determination 114 may adjust the risk level based on what kind of application 106 making the request to access hardware resources 104. For example, for each different application (e.g., app 1, app 2, and app 3), the risk level can be set as high, minimal, and critical, respectively, for camera 304.

In the example of FIG. 3C, authorization module 110 may automatically adjust the risk level based on user location 316. For example, if user location is at home 318, the risk level can be set as low for webcam 320 and high for microphone 306, respectively. On the other hand, if user location is in office 322, the risk level can be set as high for webcam 320 and low for microphone 306, respectively.

Figure 4:
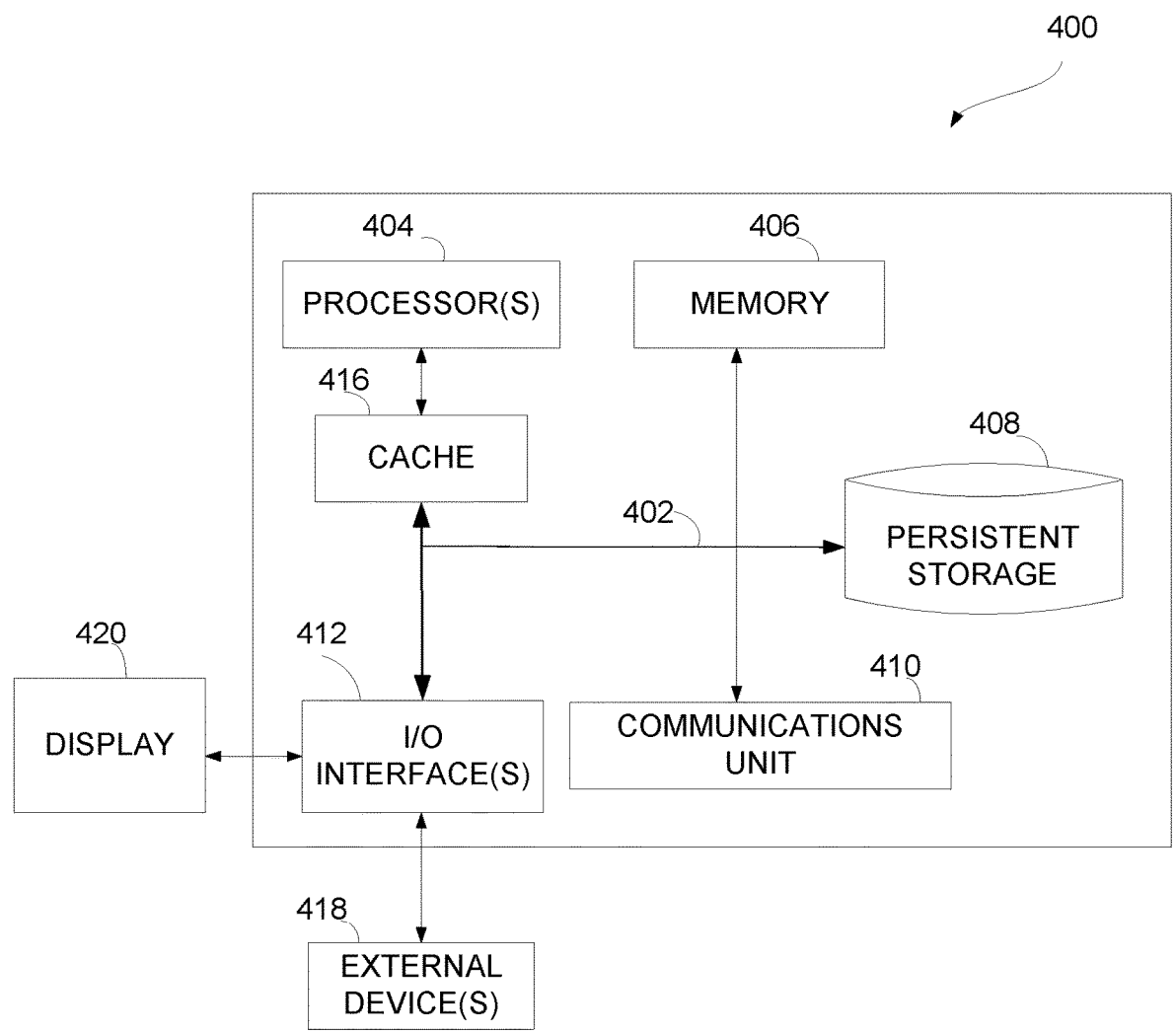
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Authorization module 110 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Authorization module 110 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., authorization module 110 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   receiving, by one or more processors, a request for a hardware resource of a plurality of monitored hardware resources located on or connected to a computing device;
   calculating, by one or more processors, a risk level of accessing the hardware resource of the request based on a respective risk level data repository, wherein the risk level in the respective risk level data repository indicates an action executed on the hardware resource when a risk level condition is met, the risk level condition being based on at least a device status associated with an activity status of the hardware resource;
   adjusting, by one or more processors, the risk level based on the device status associated with the activity status of the hardware resource, wherein the device status is one of at least three activity status indicators identifying the device status as idle, active or logged off, wherein the risk level is adjusted to critical when the device status is logged off;
   in response to a determination that the risk level requires multifactor authorization, identifying, by one or more processors, a mechanism used by a user to log in;

determining, by one or more processors, whether a challenge associated with the multifactor authorization based on the mechanism is successful; and in response to a determination that the challenge associated with the multifactor authorization is successful, enabling, by one or more processors, access to the hardware resource of the request.

2. The computer-implemented method of claim 1, further comprising:

monitoring, by one or more processors, the request of accessing the plurality of hardware resources during runtime when the user is already logged in, wherein the adjusting the risk level based on the device status associated with the activity status of the hardware resource comprises adjusting the risk level to high based on the device status being idle.

3. The computer-implemented method of claim 1, wherein the risk level is a level that is used to define the action that will be executed in response to the risk level condition being met.

4. The computer-implemented method of claim 1, wherein the risk level is further based on a factor selected from the group consisting of: application type, application metadata, user location, and user activity, wherein the adjusting the risk level based on the device status associated with the activity status of the hardware resource comprises adjusting the risk level to minimal based on the device status being active.

5. The computer-implemented method of claim 1, further comprising:

adjusting, by one or more processors, the risk level based on a type of application that is making the request to access the hardware resource; and in response to a determination that the risk level does not require the multifactor authorization, monitoring the plurality of hardware resources.

6. The computer-implemented method of claim 1, further comprising:

in response to a determination that the mechanism used by the user to log in requires the multifactor authorization, presenting the multifactor authorization, determining a type of the multifactor authorization to be presented based on the mechanisms used by the user to log in, and requesting a secondary factor to authorize the request to enable the hardware resource, wherein the risk level condition is further based on a permission of an application.

7. The computer-implemented method of claim 1, further comprising:

in response to a determination that the challenge associated with the multifactor authorization is not successful, executing, by one or more processors, a set of predetermined security actions.

8. A computer program product comprising:

one or more computer readable storage media, and program instructions collectively stored on the one or more computer readable storage media, the program instructions comprising:

program instructions to receive a request for a hardware resource of a plurality of monitored hardware resources located on or connected to a computing device;

program instructions to calculate a risk level of accessing the hardware resource of the request based on a respective risk level data repository, wherein the risk level in the respective risk level data repository indicates an action executed on the hardware resource when a risk level condition is met, the risk level condition being based on at least a device status associated with an activity status of the hardware resource;

program instructions to adjust the risk level based on the device status associated with the activity status of the hardware resource, wherein the device status is one of at least three activity status indicators identifying the device status as idle, active or logged off, wherein the risk level is adjusted to critical when the device status is logged off;

program instructions to, in response to a determination that the risk level requires multifactor authorization, identify a mechanism used by a user to log in;

program instructions to determine whether a challenge associated with the multifactor authorization based on the mechanism is successful; and program instructions to, in response to a determination that the challenge associated with the multifactor authorization is successful, enable access to the hardware resource of the request.

9. The computer program product of claim 8, further comprising:

program instructions to monitor the request of accessing the plurality of hardware resources during runtime when the user is already logged in; and program instructions to adjust the risk level based on the device status associated with the activity status of the hardware resource comprises adjusting the risk level to high based on the device status being idle.

10. The computer program product of claim 8, wherein the risk level is a level that is used to define the action that will be executed in response to the risk level condition being met.

11. The computer program product of claim 8, further comprising:

program instructions to adjust the risk level based on the device status associated with the activity status of the hardware resource comprises adjusting the risk level to minimal based on the device status being active, wherein the risk level is further based on a factor selected from the group consisting of:

application type, application metadata, user location, and user activity.

12. The computer program product of claim 8, further comprising:

program instructions to adjust the risk level based on a type of application that is making the request to access the hardware resource; and program instructions to, in response to a determination that the risk level does not require the multifactor authorization, monitor the plurality of hardware resources.

13. The computer program product of claim 8, further comprising:

program instructions to, in response to a determination that the mechanism used by the user to log in requires the multifactor authorization, present the multifactor authorization, determine a type of the multifactor authorization to be presented based on the mechanisms used by the user to log in, and request a secondary factor to authorize the request to enable the hardware resource, wherein the mechanism used by the user to log in includes a PIN or password and the secondary factor includes validation from a secondary device.

14. The computer program product of claim 8, further comprising:
program instructions to, in response to a determination that the challenge associated with the multifactor authorization is not successful, execute a set of predetermined security actions,
wherein the risk level condition is further based on a permission of an application.

15. A computer system comprising:
one or more computer processors, one or more computer readable storage media, and program instructions stored on the one or more computer readable storage media for execution by at least one of the one or more computer processors, the program instructions comprising:
program instructions to receive a request for a hardware resource of a plurality of monitored hardware resources located on or connected to a computing device;
program instructions to calculate a risk level of accessing the hardware resource of the request based on a respective risk level data repository, wherein the risk level in the respective risk level data repository indicates an action executed on the hardware resource when a risk level condition is met, the risk level condition being based on at least a device status associated with activity status of the hardware resource;
program instructions to adjust the risk level based on the device status associated with the activity status of the hardware resource, wherein the device status is one of at least three activity status indicators identifying the device status as idle, active or logged off, wherein the risk level is adjusted to critical when the device status is logged off;
program instructions to, in response to a determination that the risk level requires multifactor authorization, identify a mechanism used by a user to log in;
program instructions to determine whether a challenge associated with the multifactor authorization based on the mechanism is successful; and
program instructions to, in response to a determination that the challenge associated with the multifactor authorization is successful, enable access to the hardware resource of the request.

16. The computer system of claim 15, further comprising:
program instructions to monitor the request of accessing the plurality of hardware resources during runtime when the user is already logged in; and
program instructions to adjust the risk level based on the device status associated with the activity status of the hardware resource comprises adjusting the risk level to high based on the device status being idle.

17. The computer system of claim 15,
wherein the risk level is a level that is used to define the action that will be executed in response to the risk level condition being met.

18. The computer system of claim 15, further comprising:
program instructions to adjust the risk level based on the device status associated with the activity status of the hardware resource comprises adjusting the risk level to minimal based on the device status being active,
wherein the risk level is further based on a factor selected from the group consisting of:
application type, application metadata, user location, and user activity.

19. The computer system of claim 15, further comprising:
program instructions to adjust the risk level based on a type of application that is making the request to access the hardware resource; and
program instructions to, in response to a determination that the risk level does not require the multifactor authorization, monitor the plurality of hardware resources.

20. The computer system of claim 15, further comprising:
program instructions to, in response to a determination that the mechanism used by the user to log in requires the multifactor authorization,
present the multifactor authorization,
determine a type of the multifactor authorization to be presented based on the mechanisms used by the user to log in, and
request a secondary factor to authorize the request to enable the hardware resource,
wherein the mechanism used by the user to log in includes a fingerprint and the secondary factor includes a PIN or password,
wherein the risk level condition is further based on a permission of an application.

* * * * *